Nov. 3, 1942.                W. H. SMITH                2,300,471
                           VOLTAGE REGULATOR
                         Filed April 18, 1939            3 Sheets-Sheet 1

WITNESSES:

INVENTOR
Walter H. Smith.
BY
ATTORNEY

Nov. 3, 1942.  W. H. SMITH  2,300,471
VOLTAGE REGULATOR
Filed April 18, 1939   3 Sheets-Sheet 2

WITNESSES:
*C. J. Weller.*
*Wm. C. Groome*

INVENTOR
*Walter H. Smith.*
BY
*Franklin E. Hardy*
ATTORNEY

Nov. 3, 1942.   W. H. SMITH   2,300,471
VOLTAGE REGULATOR
Filed April 18, 1939   3 Sheets-Sheet 3

WITNESSES:

INVENTOR
Walter H. Smith.
BY
Franklin E. Hardy
ATTORNEY

Patented Nov. 3, 1942

2,300,471

UNITED STATES PATENT OFFICE 2,300,471

VOLTAGE REGULATOR

Walter H. Smith, Wilkinsburg, Pa., assignor to Westinghouse Electric & Manufacturing Company, East Pittsburgh, Pa., a corporation of Pennsylvania Application April 18, 1939, Serial No. 268,550

2 Claims. (Cl. 201—51)

This invention relates to regulating apparatus such as is adapted for regulating the output voltage of variable speed generators. In certain electrical generator applications, it is desirable to drive the generator at varying speeds. For example, in generators employed on vehicles it is convenient to drive the generator at a speed that varies in accordance with the speed of the vehicle. Such generators may be employed for supplying electric energy to circuits, to which electric lamps and other electrical apparatus are connected and for supplying energy to a storage battery connected to the circuit, which battery receives energy from the generator when the generator is operating at normal voltage and speed, and supplies energy to the circuit when the vehicle and generator are not in motion or are operating at a speed below that necessary to develop the voltage required for supplying the circuit.

When a shunt-wound excited variable speed generator is used in a system of the character described, it is desirable to provide a maximum field excitation during the starting of the generator until the voltage builds up to a normal value. It is desirable, therefore, to provide a minimum amount of regulating resistance in the generator field circuit in order that the generator voltage may build up to normal line circuit voltage at as low a generator speed as possible. It is also desirable to control the generator excitation to maintain a substantially constant voltage output therefrom at speeds above the minimum at which the desired voltage may be developed and to modify this value in accordance with the current output from the generator so as to limit, for example, the rate of charge of a battery connected to it. In regulator systems of the character indicated in which the field excitation is controlled by a variable regulating resistor in the generator field circuit, such as a stack of carbon or graphite discs, the increasing force on the regulating resistor while the generator is below the speed necessary to develop the desired or line circuit voltage, tends to vary the resistance in the field winding circuit before the generator voltage has built up to its desired value, thus increasing the generator speed required to develop full voltage. In the herein described regulator, means is provided to delay the change in field resistance value during the increase in generator voltage until that voltage has substantially reached its desired value. Means is also provided to decrease the friction of movement of the resistor discs so as to increase the sensitivity of regulation by permitting a greater and more accurate change in resistance upon a small change in pressure on the stack. Thus, a small amount of energy and a small movement of the control element is effective to develop a large correction in field excitation.

An object of the invention is the provision of a regulator of the character indicated in which the generated voltage will build up rapidly to its desired value upon an increase in the generator speed from a low value, and will thereafter be accurately maintained at the desired value.

A further object of the invention is the provision of a regulator of the character indicated that is effective to control the field excitation of a generator to limit both the generator voltage output and the generator current output.

A further object of the invention is the provision of a regulator of the character indicated that is accurate in operation and sensitive to slight changes in the applied force and that requires a small amount of energy to operate.

Other objects and advantages of the invention will be apparent from the following description of preferred embodiments thereof, reference being had to the accompanying drawings, in which Figure 1 is a side elevational view of one embodiment of the invention, parts being broken away or shown in section to more clearly illustrate the structure shown.

Figure 1:
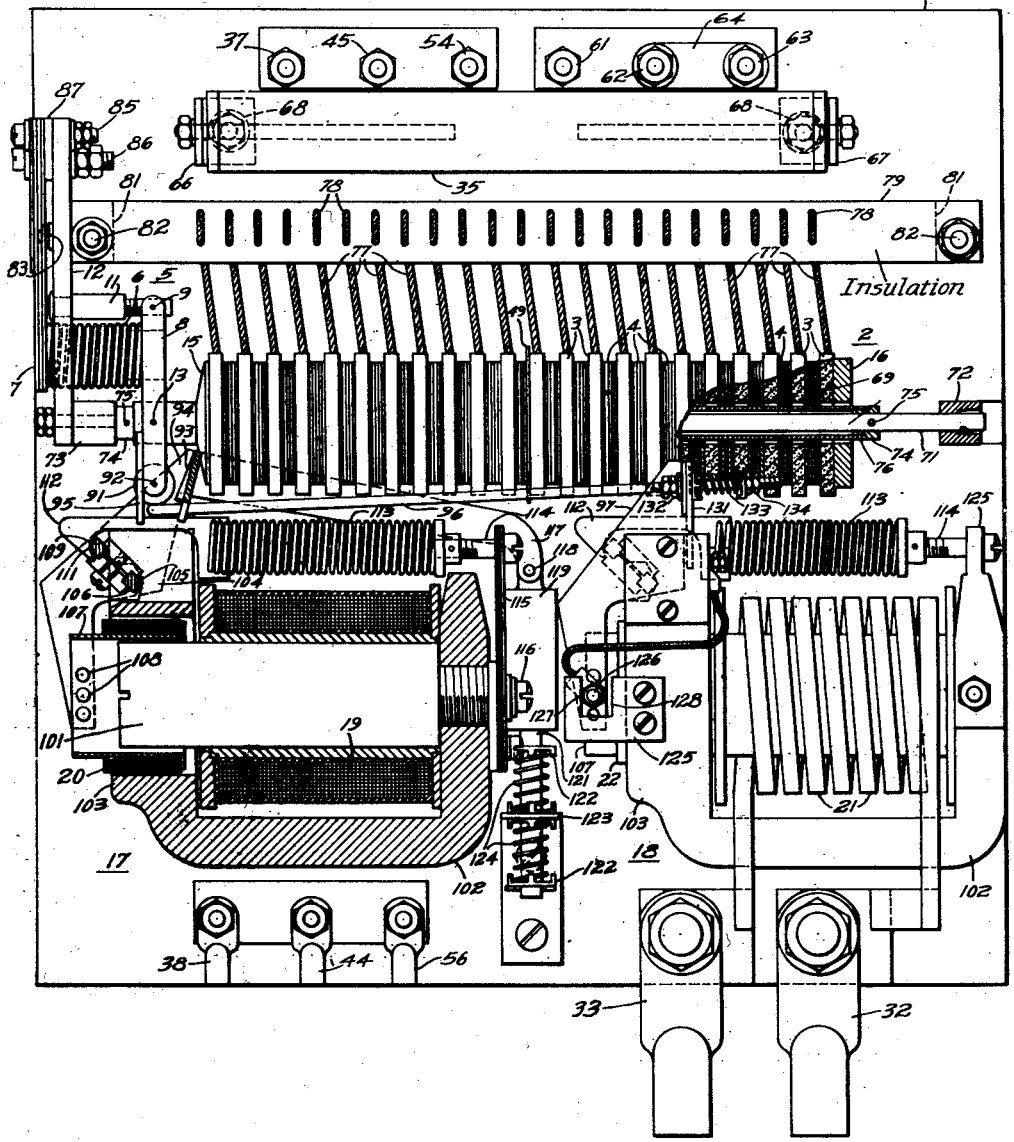
Figure 2:
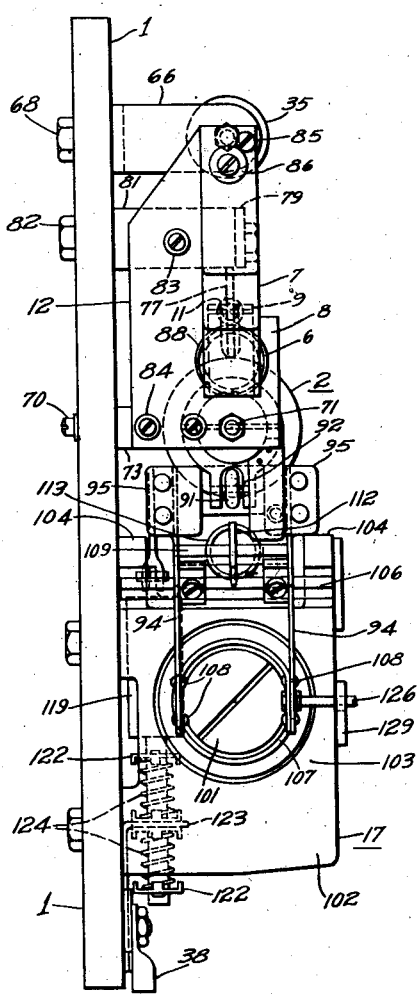
Fig. 2 is a left elevational end view of the structure shown in Fig. 1.
Figure 3:
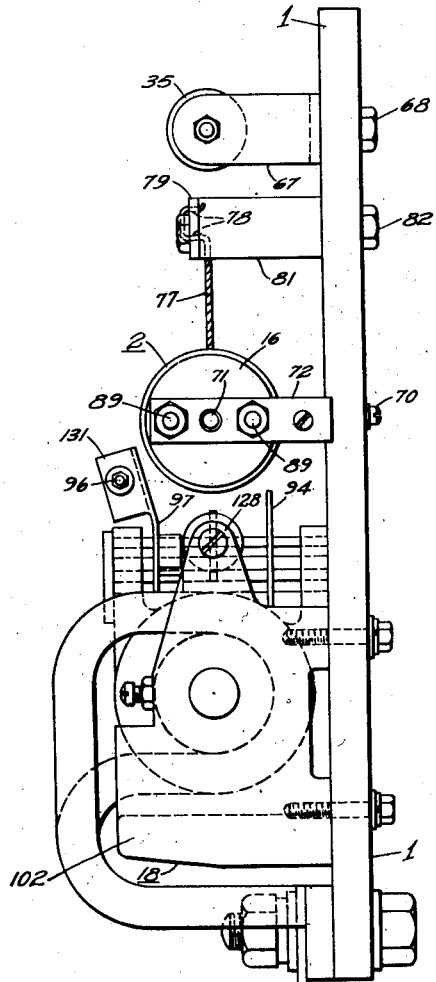
Fig. 3 is a right elevational end view of the structure shown in Fig. 1.

Referring to the drawings and particularly to Figs. 1, 2 and 3 thereof, the regulating structure is mounted on a panel 1 and consists of a carbon or graphite stack of discs 2 which, in the form illustrated in Fig. 1, comprises a plurality of discs 3 of relatively larger thickness and larger diameter than groups of discs 4 alternately positioned between the discs 3. A pressure adjusting mechanism 5 is provided at one end of the stack which includes a spring 6, one end of which engages a bimetal temperature compensating structure 7 and the other end of which engages a yoke 8. The upper end of the yoke 8 is mounted on a pivot pin 9 carried in a stud 11 extending from a supporting member 12 mounted on the panel 1. The lower end of the yoke 8 is connected by means of a pivot 13 to a collar 14 extending from a pressure plate 15 positioned against one end of the resistor stack and which acts against a fixed abutment or pressure plate 16 at the other end of the stack to vary the pressure thereon.

The spring pressed yoke 8 may be moved against the bias of the spring 6 by either a voltage element 17 or a current element 18. Each of these actuating elements is provided with two coils, the voltage element 17 having a stationary coil 19 and a movable coil 20 and the current element 18 having a stationary coil 21 and a movable coil 22.

Figure 7:
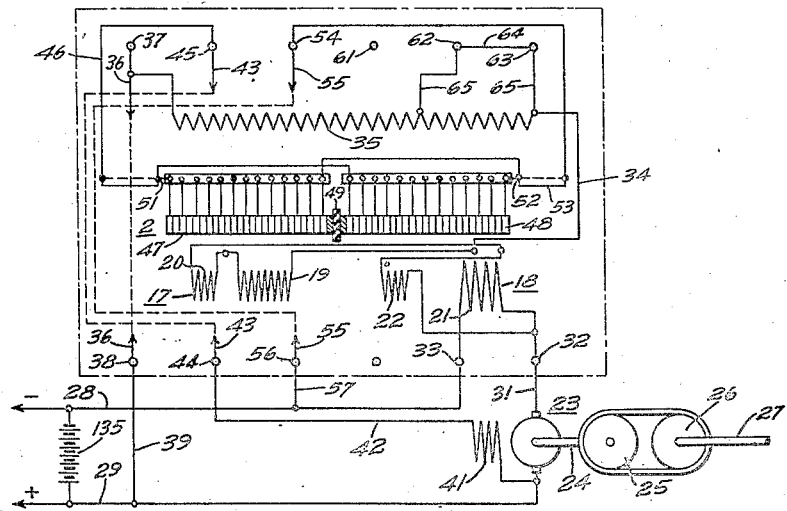

The circuits employed will be most readily understood by referring to the diagram in Fig. 7, in which the apparatus shown within the rectangle corresponds to that illustrated in Fig. 1. In Fig. 7 a variable speed generator 23 is shown, the armature of which is driven by a shaft 24 and pulley 25, or other suitable means, from a pulley 26 on a shaft 27 that revolves in accordance with the speed of the vehicle upon which the equipment is mounted. The generator armature 23 is connected to supply energy to circuit conductors 28 and 29, one terminal of the generator being connected by conductor 31 to one terminal 32 of the current winding 21 and through the opposite terminal 33 thereof to conductor 28. The three windings 22, 19 and 20 are connected in series circuit relation across the armature of the generator 23 by a circuit that extends from terminal 32 through the windings 22, 19 and 20 and by means of conductor 34, a selected portion of an adjusting resistor 35, jumper 36 between terminals 37 and 38 on the panel 1 and by conductor 39 to the line conductor 29. This circuit impresses a voltage on the windings 22, 19 and 20 that is a measure of the voltage of the generator 23. The excitation of the generator is controlled by a circuit extending from line conductor 29 through the generator field winding 41, conductor 42, a jumper 43 between terminals 44 and 45 on the panel 1, conductor 46 to terminal 51 of the carbon pile stack, thence through two portions of the stack 47 and 48 that are separated by an insulating member 49 and connected in parallel between stack terminals 51 and 52, then by conductor 53, terminal 54, jumper 55, terminal 56 and conductor 57 to the line circuit conductor 28. The portion of the adjusting resistor 35 connected in series with the voltage coils 22, 19 and 20 may be varied through studs 61, 62 and 63 provided on the panel by the use of connecting links 64 and conductors 65. The jumpers 36, 43 and 55, connecting, respectively, terminals 37 and 38, 45 and 44, and 54 and 56 are shown broken away so as to more clearly show the remaining circuits through apparatus mounted on the panel 1.

Referring again to Figs. 1, 2 and 3, the voltage adjusting resistor 35 which may be of a well known cylindrical construction is carried on supports 66 and 67 that are mounted near the top of the panel 1 by bolts 68. The resistor discs 3 and 4 comprising the voltage regulating resistor are provided with openings 69 centrally thereof through which a metal rod 71 extends. The rod 71 is mounted on supports 72 and 73 that are attached to the panel 1 by any suitable means such as the screw 70. Metal sleeves 74 are provided and attached to the metal rod 71 by any suitable means, such as pins 75 to position a tube 76 of insulating material, such as glass, which extends between the sleeves 74 through the openings 69 centrally of the discs 3 and 4, and is of lesser diameter than the diameter of the openings 69 to permit a limited movement of the discs vertically with respect to the tube 76. In order to decrease the friction that might otherwise exist between the discs 3 of resistor material and the tube 76, the several discs 3 are supported by individual cables 77, the lower ends of which are embedded in the carbon graphite discs and the upper ends of which are inserted through openings 78 in a support 79 that extends substantially parallel to the variable resistor stack and is supported from the panel 1 by blocks 81 that are fastened thereto by the bolts 82.

Figure 4:
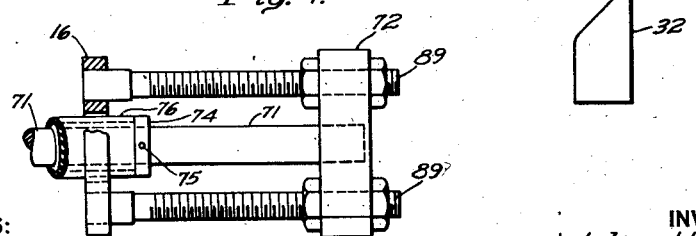
Fig. 4 is a detail showing the means for positioning the fixed pressure plate from its supporting member.

The support 12, upon which the parts of the follow-up mechanism are mounted, is attached to the supporting blocks 81 and 73, respectively, by the screws 83 and 84. The bimetal structure 7 is attached to the support 12 by bolts 85 and 86 and a spacer member 87. An opening 88 is provided in the support 12 through which the spring 6 extends, opposite ends of which press against the bimetal 7 and the movable yoke 8. The fixed abutment 16 at the right end of the resistor stack, as viewed in Fig. 1, may be rigidly supported from the block 72 by struts or bolts 89, as shown in Figs. 3 and 4.

A roller 91 is attached by the pin 92 to the lower end of the yoke 8 and is adapted to be engaged by the surface of a block 93 carried by a movable lever of the voltage element 16 comprising parallel plates 94. A contact plate 95 is also mounted on the lower end of the yoke 8 and is adapted to be engaged by the end of a rod 96, the opposite end of which is attached to a lever 97 of the current element 18.

The voltage element 17, in addition to coils 19 and 20 previously referred to, includes a magnetic core structure having a central winding leg portion 101 which extends centrally within the coils 19 and 20, and an outer core portion 102 completing the magnetic circuit and having an annular part 103 extending about the left end of the central core portion 101, as viewed in Fig. 1, so as to completely surround the movable coil 20. The annular portion 103 of the core structure is provided with upwardly extending brackets 104 provided with a fulcrum point 105 at the point of contact between the brackets and a square bar 106 that extends between parallel plates 94. The lower ends of the parallel members 94 are attached to opposite sides of a central sleeve 107 by rivets 108 upon which sleeve the movable coil 19 is wound. Another square bar 109 extends between the parallel members 94 above and to the left of the bar 106 as viewed in Fig. 1, one corner 111 of which provides a contact point for a hook 112 which engages the bar 109 to actuate the lever plates 94 in a clockwise direction about the fulcrum 105 under the influence of the spring 113 fastened between the hook member 112 and a stud 114 carried by a bimetal support 115 attached to the core structure by a screw 116. An arm 117 is attached to the lever 94 and is pivotally connected at its outer end by means of a pin 118 to the cup portion 119 of a dashpot, the inner or piston portion of which is connected by a shaft 121 to washers 122 on opposite sides of an abutment 123 carried on the panel 1, between which abutment and the washers 122 centering springs 124 are provided. It will be noted that a line between the fulcrum point 105 of the moving arm assembly of the voltage element and the point of contact 111 between the hook 112 and the moving assembly forms an acute angle with the line from contact point 111 through the center of the spring 113, so that, as the assembly moves in a counterclockwise direction about the pivot line 105, the lever arm through which the force of the spring 113 acts, decreases rapidly, thus compensating for any increase in spring tension occasioned by lengthening of the spring.

The bimetal member 7 is affected by ambient temperature to vary the tension of the spring 6 so as to compensate the resistance of the resistor stack in accordance with variations in the ambient temperature of the air surrounding it. The bimetal structure 115 attached to the core 102 of the voltage element varies the pull on the spring 113 in accordance with changes in temperature of the voltage element structure so as to compensate for changes in magnetic pull resulting from varying resistance in the windings 19 and 20 occasioned by changes in the temperature of the regulating element.

The current responsive element 18 is similar in general structure to that of the voltage responsive element 17 having the same core parts 101 and 102, a similar movable lever assembly mounted on brackets extending upwardly from the annular portion 103 of the core structure, and is actuated by a similar hook 112 and spring 113, carried by a stud 114 mounted on a bracket 125 extending upwardly from the core structure 102. As best shown on the current control element 17, each of the relay elements 17 and 18 is provided with a pin 126 extending outwardly from the lower portion of the lever for engaging the one or the other of the surfaces 127 or 128 on opposite sides of a slot in a stop member 129 for limiting the movement of the movable lever 97. The upper end of the lever 97 of the current relay element 18 is provided with an outwardly extending portion 131 to which the rod 96 is attached by any suitable means, such as a nut 132 that is screw threadedly attached to the rod 96, and a spring 133 acting between the portion 131 and nuts 134 on the outer end of the rod 96. It will be noted that the stationary winding 21 of the current relay element 18 differs from the stationary coil 19 of the voltage relay element 17 in that it consists of a few turns of the large conductor in series between the armature of the generator to the load being supplied.

Referring to Fig. 7, a battery 135 is shown connected between circuit conductors 28 and 30 and in systems of the character described automatic switching means are usually provided for disconnecting the generator from the supply circuit conductors and from the battery and other devices connected thereto when the speed of the generator is below the value necessary to develop the desired voltage of the circuit supplied therefrom. Such automatic switching means is effective to connect the generator to the supply circuit and to the battery to be charged therefrom as the generator voltage approaches the desired line circuit voltage.

It will be noted that the compression spring 6 applies maximum pressure to the variable pressure resistor when the energization of the voltage and current elements 17 and 18, respectively, are low, thus effecting maximum field and maximum generator voltage for a given speed when the generator speed is increased from standstill to the desired value. It will be noted that a space exists between the roller 91 carried by the yoke 8 and the surface 93 of the block carried by the lever 94 that is actuated in a counterclockwise direction against the force of the spring 113 upon an increase in voltage applied to the coils 19 and 20. This space provides for an amount of movement of the lever assembly 94 about the pivot line 105 against the bias of the spring 113 while the generator voltage is building up from a low value to the desired value to be maintained on the circuit, at which desired value the surface 93 engages the roller 91 to thereafter, upon further movement of the lever 94 in a counterclockwise direction, move the yoke 8 and the pressure disc 15 toward the left against the bias of the spring 6 to decrease the pressure on the carbon pile stack and increase the resistance thereof, to thereby limit the generator voltage substantially to the desired value.

Upon the flow of current from the generator 23 to the battery 135 or to other apparatus connected to the circuit conductors 28 and 29, a similar movement of the lever assembly 97 in a counterclockwise direction against the bias of the spring 113 of the current relay element 18 will move the rod 96 toward the left. It will be noted that a space is provided between the end of the rod 96 and the plate member 95 engaged thereby so as to permit a predetermined amount of movement of the rod 96 corresponding to a predetermined increase in current through the winding 21 before the current element 18 becomes effective to move the yoke 8 toward the left about the pivot pin 9. After the current through the winding 21 has become sufficient to move the rod 96 into engagement with the contact plate 95, a further increase in current in the winding 21 causes a further movement of the rod 96 and of the yoke 8 toward the left against the compression of the spring 6, thus moving the pressure disc 15 toward the left to decrease the pressure on the carbon pile stack to correspondingly limit the current output of the generator independently of whether or not full generator voltage is maintained. It will be seen, therefore, that the regulator limits both the voltage output and the current output of the generator so as to prevent excessive voltage under all conditions and excessive current output when a low resistance load is connected to the circuit supplied by the generator.

Referring to the carbon pile stack shown in Fig. 1, the use of relatively thick and relatively large diameter discs 3 between which a plurality of thinner discs 4 of smaller outer diameter are positioned, provides a stack having desirable heat radiating characteristics in that the outer surface of the stack is increased while a relatively large number of contact surfaces are also provided.

Figure 5:
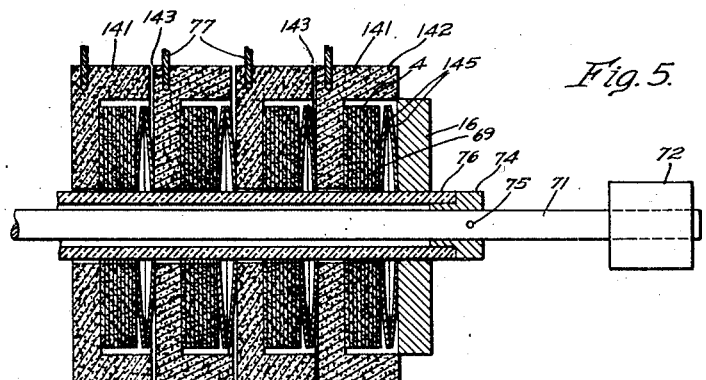
Figs. 5 and 6 are sectional views of one embodiment of a portion of the structure that may be used in the regulator shown in Fig. 1; and, Fig. 7 is a diagrammatic view of the circuits and apparatus employed in a regulator system governed by the regulator disclosed in Fig. 1.
Figure 6:
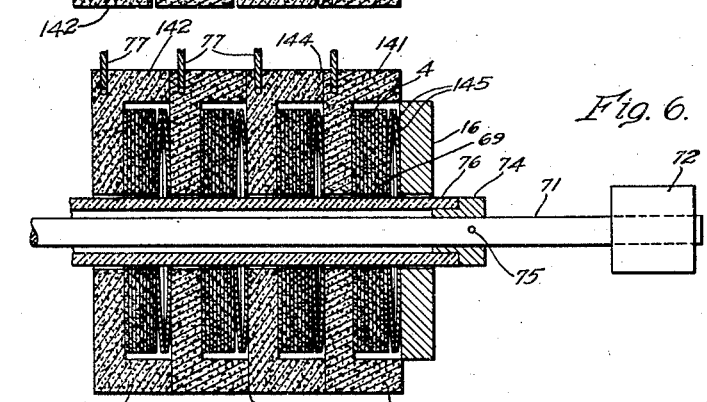

Referring to Figs. 5 and 6, a variable resistor stack is illustrated in which discs 141 are provided that are larger in outer diameter and thicker than the groups of discs 4 and are provided with outer annular portions 142 forming cylindrical walls about the thinner discs 4. It will be noted that in Fig. 5, when the resistance of the stack is relatively high, a space 143 exists between the outer or heavier resistor elements 141, as shown in Fig. 5, and that as the pressure on the stack is increased so as to reduce the resistance between the surfaces of the elements 4 and 141, the outer resistor elements 141 eventually come into contact as shown at 144 in Fig. 6, thus short circuiting the discs 4 of smaller diameter and permitting a lower minimum resistor value for the stack than is obtainable with all contact surfaces in series. If desired, certain of the thinner and smaller diameter discs may be concave in form as shown at 145 to permit a slightly greater movement of the larger resistor elements 141 than is otherwise easily obtained.

Many modifications in the circuits and apparatus disclosed within the spirit of my invention will occur to those skilled in the art and I do not wish to be limited other than by the scope of the appended claims.

I claim as my invention:

1. In apparatus of the class described, in combination, a pressure controlled variable resistance device, biasing means for applying pressure to said resistance device and electroresponsive means for varying the pressure thereon, said variable resistance device comprising a stack of discs of high resistance material provided with central openings therein, an insulating member extending through said central opening to aline said discs, said stack comprising discs of relatively large diameter and thickness arranged alternately with groups of discs of relatively small diameter and thickness, and individual supporting means for suspending the discs of relatively larger diameter out of supporting engagement with the member extending centrally therethrough, said discs of larger outer diameter having annular flange portions surrounding adjacent groups of relatively thin discs and adapted upon the application of sufficient pressure to the stack to engage the next adjacent disc of like diameter.

2. In apparatus of the class described, in combination, a pressure controlled variable resistance device, biasing means for applying pressure to said resistance device and electroresponsive means for varying the pressure thereon, said variable resistance device comprising a stack of discs of high resistance material provided with central openings therein, an insulating member extending through said central opening to aline said discs, said stack comprising discs of relatively large diameter and thickness arranged alternately with groups of discs of relatively small diameter and thickness, and individual supporting means for suspending the discs of relatively larger diameter out of engagement with the member extending centrally therethrough, said discs of larger outer diameter having annular flange portions surrounding adjacent groups of relatively thin discs and adapted upon the application of sufficient pressure to the stack to engage the next adjacent disc of like diameter, certain of said thin discs being concave in shape.

WALTER H. SMITH.